United States Patent Office 2,784,366
Patented Mar. 5, 1957

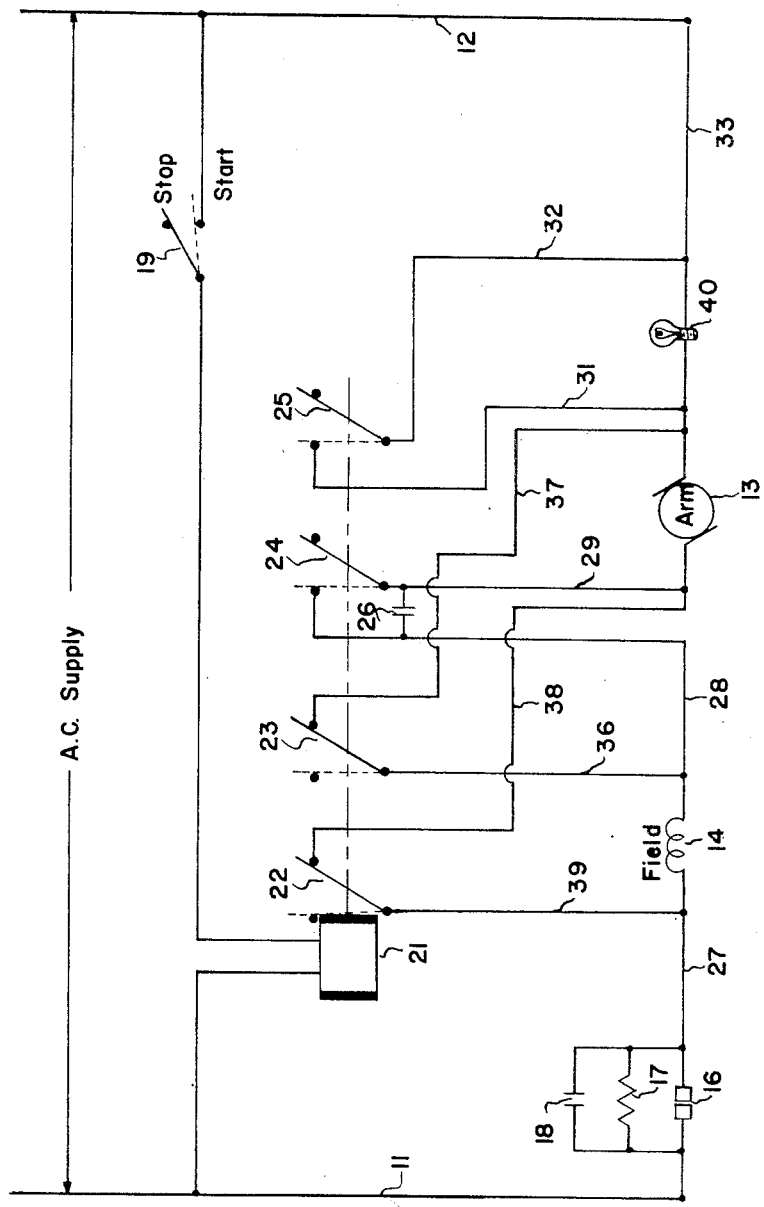
March 5, 1957 R. B. STEELE 2,784,366
METHOD AND APPARATUS FOR DYNAMIC BRAKING
Filed Dec. 3, 1953 2 Sheets-Sheet 1
FIG. I
INVENTOR
Richard B. Steele
BY
ATTORNEY

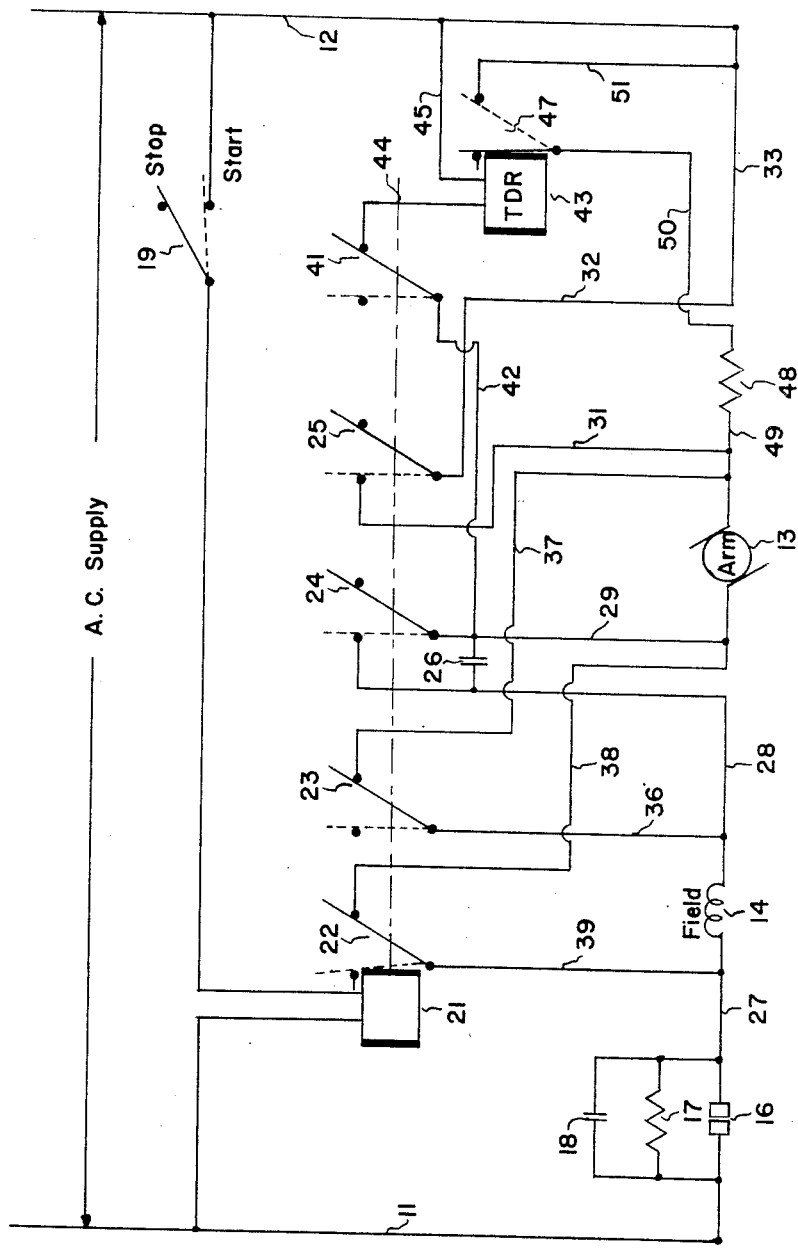

2,784,366
METHOD AND APPARATUS FOR DYNAMIC BRAKING

Richard B. Steele, New Providence, N. J., assignor to Air Reduction Company, Incorporated, New York, N. Y., a corporation of New York Application December 3, 1953, Serial No. 396,037

9 Claims. (Cl. 318—379)

This invention relates to alternating current electric motor controls generally and more particularly to a braking system for series field wound rotor motors.

It is frequently desirable, in electric motor driven machinery, to eliminate coasting due to inertia and to effect substantially instantaneous stopping of the motor and the load when the motor circuit is interrupted. One such instance occurs in the field of electric arc welding in which a continuous wire electrode is fed toward the arc to maintain an arc from the wire to the work as the wire melts off from the heat of the arc and the molten metal is deposited on the work. Such an arc is of the order of ¼ inch in length. The wire feed rate toward the work may be of the order of several hundred inches per minute. When the arc is interrupted at the end of a weld by interrupting the welding current it is essential that the wire feed stop instantaneously. Should the wire feed mechanism coast any appreciable amount the end of the electrode wire will be plunged into the molten weld puddle and the weld will be spoiled. Fractional horsepower series field wound rotor motors of the universal type are frequently employed for this type service and these motors are usually operated on alternating current.

An object of the present invention is to provide a method and apparatus for reliably and instantaneously braking series field wound rotor motors energized by alternating current.

Another object is to provide braking of an A. C. motor by D. C. generator action without an auxiliary D. C. source of field excitation.

These and other objects and advantages of the invention will be pointed out or will become apparent from the accompanying drawings and the following detailed description of specific embodiments of the invention. In general the invention comprises placing the field winding in a closed circuit with the armature when the energization of the motor is interrupted to make the motor act as a self excited D. C. generator and concurrently to provide for initial magnetic excitation of this generator.

Fig. 1 of the accompanying drawings illustrates schematically one embodiment of the present invention.

Fig. 2 illustrates schematically a modified form of the invention.

In Fig. 1 A. C. supply lines are represented by conductors 11 and 12. The wound rotor, or armature, 13 and the stator, or field winding, 14 are connected in circuit across the A. C. supply with a number of relay contacts, to be hereinafter described, which enable the armature and field to be series connected across the supply line for motor operation and alternatively to be connected in a novel manner for generator action for braking of the motor. The speed of a motor of this type may conveniently be controlled by intermittent interruption of the current supply to the motor as by contacts 16 of a centrifugal governor. Bypass resistor 17 permits limited current flow to the motor when contacts 16 are open. Capacitor 18 minimizes arcing at the governor contacts.

Starting and stopping of the motor is effected by operation of switch 19 which is connected across the supply line in series with the operating coil 21 of a control relay. Switch 19 preferably operates in timed relation with a contactor in the welding circuit. The control relay has four sets of contacts 22, 23, 24, and 25. Of these, contacts 22 and 23 are normally closed and contacts 24 and 25 are normally open.

When switch 19 is closed operating coil 21 of the control relay is energized and the relay picks up, opening contacts 22 and 23 and closing contacts 24 and 25. Under these conditions a series circuit is completed from line conductor 11 through the governor contacts 16, conductor 27, field winding 14, conductor 28, relay contact 24, conductor 29, armature winding 13, conductor 31, relay contact 25, conductor 32, and conductor 33 to line conductor 12. This is a straight series field motor circuit.

When switch 19 is opened to stop the motor, contacts 22 and 23 close their circuits and contacts 24 and 25 open their circuits. Capacitor 26 prevents excessive sparking at contacts 24. This relay action results in field winding 14 and armature winding 13 being connected together in a closed circuit. This circuit comprises field winding 14, conductor 36, relay contact 23, conductor 37, armature winding 13, conductor 38, relay contact 22, and conductor 39 back to field winding 14. Rotation of the armature due to motor inertia and inertia of the load causes current to flow in this closed circuit which acts as a self excited D. C. generator with the copper losses in the armature winding and the field winding as the load. Under these conditions the energy in the moving parts is quickly dissipated and the armature stops abruptly. However a self excited generator such as this requires initial field magnetization to generate a starting voltage to further excite the field and thereby induce field strength build up. In D. C. motors this is ordinarily no problem because of residual magnetism in the machine as a result of repeated field excitation of given polarity. In the case of the A. C. motor, however, this field polarity is constantly changing and no reliable residual magnetism is available to produce generator build up when the circuit is first switched from the motor circuit to the generator circuit. It has now been found that this difficulty can be overcome by providing limited alternating current excitation of the field. This excitation is preferably provided through a variable impedance which in its simplest form is an ordinary incandescent lamp bulb. Such a lamp is represented in the drawing by the symbol designated 40.

At the instant switch 19 is opened and relay 21 is de-energized, the lamp 40, serving as a variable impedance, for an instant presents a relatively low impedance in the circuit permitting a substantial current surge through the parallel combination of the armature winding and the field winding. The rotor of the machine is rotating because of the inertia of the rotor and the other machinery coupled to the motor. Generator action is positively initiated with the initial excitation of the field winding 14 from the first half cycle of alternating current supplied from the A. C. line through lamp 40. Current builds up rapidly in the closed circuit through armature 13, conductor 37, contact 23, conductor 36, field winding 14, conductor 39, contact 22, and conductor 38 back to armature 13. The current flowing in the closed circuit as a result of the generator action is large with respect to the succeeding half cycle of A. C. provided through the lamp, and therefore the succeeding half cycle has no effect on the generator action. The energy of the moving parts is rapidly dissipated in this circuit as heat, and rotation of the rotor ceases promptly. The filament of lamp 40 quickly heats up and becomes a high resistance permitting only a negligible flow of alternating current thereafter and effectively substantially isolating the motor from the A. C. supply lines.

Without the A. C. excitation provided through lamp 40, braking action is intermittent and unreliable. If no initial excitation is provided and the circuit is interrupted when the flux is zero or near zero during polarity reversals no generator action results and the motor slowly coasts to a halt. In other instances the build up of generator flux only occurs after a delay. When A. C. field excitation is provided in accordance with the present invention, braking is effected instantly each and every time. The polarity of the initial half cycle of the alternating current exciting current surge is immaterial. In most motors to which this invention is applicable, a sufficient A. C. exciting current to produce reliable braking instantly, will, if left on for extended periods, damage the field or armature windings of the motor. For this reason it is preferred to employ an impedance device in the circuit that will pass sufficient current at the start to effectively initiate the necessary generator action and will completely interrupt or reduce the flow of current to a value that will not damage the windings before sufficient time has elapsed to cause such damage. The filament of an incandescent lamp serves this purpose as hereinbefore indicated.

By way of a specific embodiment of the present invention a 1/4 horsepower wound rotor motor was employed to feed welding wire to an arc welding operation. The motor is designed for operation on 110 volts at 60 cycles. It has an armature (rotor) winding resistance of about 2.55 ohms and a field (stator) winding resistance of about 2.62 ohms. A 50 watt incandescent lamp was used as the variable impedance. The filament of this lamp has a resistance of about 242 ohms when hot and about 22 ohms when cold. With the control circuit described above, this motor came to a complete stop in approximately 9 revolutions from a speed of about 9400 R. P. M. In terms of electrode wire feed with the particular apparatus used, the wire stopped in less than 1/4 inch of travel from an initial speed in excess of 200 inches per minute.

In order to control the rate of deceleration for other applications of the invention it may be desirable to introduce additional resistance in the closed armature-field circuit.

While it has been pointed out that this invention is operable with fixed A. C. excitation to initiate generator action it has been found desirable to reduce or interrupt this excitation to avoid overheating of the motor windings. The incandescent lamp with its filament having a positive temperature coefficient of resistance, is a convenient and serviceable variable impedance device for accomplishing this end. Other devices and circuits may be alternatively employed which will momentarily permit an ample current surge through the motor windings and thereafter substantially reduce this current to a negligible value or to zero. The circuit disclosed in Fig. 2 of the drawings is representative of such alternative systems.

The circuit of Fig. 2 is similar to that disclosed in Fig. 1 and described heretofore, with certain differences hereinafter pointed out. Similar reference numerals denote similar parts in both figures. In Fig. 2 an additional set of contacts 41 are included in the multiple contact control relay 21. One of the contacts of additional set 41 is connected to conductor 29 by conductor 42 which is connected to line conductor 11 when relay 21 is de-energized. The other contact of the additional set 41 is connected to the operating coil of time delay relay 43 by conductor 44. The other lead of the operating coil of time delay relay 43 is connected to line conductor 12 by conductor 45. This relay is of the type which provides a predetermined time delay on energization. The single pair of contacts 47 of this time delay relay 43 are in series with a fixed resistor 48. The series combination of contacts 47 and resistor 48 connect the closed circuit including armature winding 13 and field winding 14 to the line conductor 12 through conductors 49, 50, and 51. This resistor 48 provides current control for the excitation of the field winding during the initiation of braking action. Thus, when switch 19 is opened the relay contacts 22, 23, 24, and 25 function as described before in connection with Fig. 1 to interrupt the series field-motor circuit and to place the armature winding 13 and the field winding 14 in a closed circuit connected to the line conductor 11 through the governor contacts 16 and to line conductor 12 through control resistor 48 and time delay relay contacts 47. Simultaneously, the operating coil of time delay relay 43 is energized through control relay contacts 41. After a short time delay the armature of time delay relay 43 picks up, thus opening normally closed contacts 47 and thereby completely interrupting the flow of alternating current through the motor windings. During the time between the opening of control relay contacts 25 and the delayed opening of time delay relay contacts 47, alternating current flows through field winding 14 to provide the necessary field excitation to initiate generator action in the closed armature-field generator circuit.

Thus, in the circuit disclosed in Fig. 1, provision is made for reducing the A. C. excitation of the generator field after a time delay caused by the positive temperature coefficient of resistance of the lamp filament whereas in the circuit disclosed in Fig. 2 the initial excitation of the generator field is completely interrupted by the opening of time delay relay contacts 47. Many other alternate circuits are possible where it is desirable to reduce or eliminate field excitation after the braking action has begun in order to prevent unnecessary heating of the motor windings. For example, a centrifugal plugging switch could be employed to interrupt the A. C. excitation when the motor speed has fallen below some predetermined rate.

It will be evident that as a result of this invention it has been made possible to instantaneously and reliably brake a series field wound rotor A. C. motor by D. C. generator action without need for external or auxiliary D. C. generator field excitation. While a limited number of specific embodiments of the invention have been shown and described herein in connection with a universal-type series field motor, it is to be understood that the invention is not limited to the particular form shown but may be used in other ways without departure from its spirit as defined by the following claims.

I claim:

1. The method of braking a series field wound rotor motor energized from an alternating current source which comprises connecting said motor field winding and armature winding in a closed circuit excluding said source, and energizing said field winding with alternating current of sufficient strength from said source to provide initial field excitation from a half cycle of said alternating current to induce self-excited direct current generator action in said closed circuit.

2. The method of braking a series field wound rotor motor energized from an alternating current source which comprises connecting said motor field winding and armature winding in a closed circuit excluding said source, energizing said field winding with alternating current of sufficient strength from said source to provide initial field excitation from a half cycle of said alternating current to induce self-excited direct current generator action in said closed circuit, and substantially reducing said alternating current energization after a brief predetermined period.

3. In a series field electric motor circuit including a source of alternating current, a motor field winding and a motor rotor winding, a braking system comprising means for connecting said field winding and said rotor winding in a closed circuit excluding said source to function as a self excited direct current generator and means for applying alternating current of sufficient strength from said source to said field winding to provide initial excitation of said field to positively initiate said direct current generator action from a half cycle of said alternating current.

4. In a braking system for a series field electric motor which includes in circuit a source of alternating current, a motor field winding, and a motor armature winding, the improvement which comprises means for connecting said field winding and said armature winding in a closed circuit excluding said source and variable impedance means connecting said field winding to said alternating current source to provide a pulse of alternating current of short duration from said alternating current source in said field winding to excite said winding from a half cycle of said alternating current with sufficient strength to initiate direct current generator action in said closed circuit and to thereafter substantially isolate said closed circuit from said alternating current source.

5. A braking system according to claim 4 in which said variable impedance means comprises a resistance element having a positive temperature coefficient of resistance.

6. A braking system according to claim 4 in which said variable impedance means comprises the filament of an incandescent lamp.

7. A braking system according to claim 4 in which said variable impedance means comprises a fixed impedance in circuit with circuit interrupting contacts of a time delay switch device.

8. An alternating current motor control circuit including switch means comprising four sets of contacts, means including two sets of contacts of said switch means for connecting a motor field winding and a motor armature winding in series across an alternating current source in one operating position of said switch means and means including two additional contacts of said switch means to connect said field winding and said armature winding in parallel and said parallel combination in series with the filament of an incandescent lamp across said alternating current source upon a change in the operating position of said switch means.

9. An alternating current motor control circuit including means for connecting a motor field winding and a motor armature winding in series across an alternating current source for motor operation and alternate means to connect said field winding and said armature winding in a parallel connected combination in series with the filament of an incandescent lamp across said alternating current source for braking of said motor.

References Cited in the file of this patent

UNITED STATES PATENTS

| 925,355 | Lamme | Jan. 15, 1909 |
| 1,089,384 | Alexanderson | Mar. 3, 1914 |

FOREIGN PATENTS

| 2,677 | Great Britain | of 1907 |
| 144,263 | Great Britain | May 26, 1921 |